United States Patent [19]

Stephany

[11] Patent Number: 4,691,200

[45] Date of Patent: Sep. 1, 1987

[54] MATRIX DISPLAY WITH A FAST CURSOR

[75] Inventor: Joseph F. Stephany, Williamson, N.Y.

[73] Assignee: Xerox Corporation, Stamford, Conn.

[21] Appl. No.: 656,191

[22] Filed: Oct. 1, 1984

[51] Int. Cl.[4] .......................... G09F 9/35; G06F 3/147

[52] U.S. Cl. .................................... 340/784; 340/801; 340/803; 340/709

[58] Field of Search ............... 340/709, 723, 784, 789, 340/783, 785, 752, 791, 800, 801, 802, 803, 804, 805, 708; 350/332

[56] References Cited

U.S. PATENT DOCUMENTS

| | | | |
|---|---|---|---|
| 3,776,615 | 12/1973 | Tsukamoto et al. | 350/160 LC |
| 3,787,834 | 1/1974 | Elliott | 340/324 M |
| 3,835,463 | 9/1974 | Tsukamoto et al. | 340/324 M |
| 3,840,695 | 10/1974 | Fischer | 358/61 |
| 3,863,221 | 1/1975 | Kaji | 340/166 |
| 3,895,372 | 7/1975 | Kaji et al. | 340/324 M |
| 3,908,151 | 9/1975 | Schermerhorn | 315/169 TV |
| 3,911,419 | 10/1975 | Bates et al. | 340/324 |
| 3,921,162 | 11/1975 | Fukai et al. | 340/324 M |
| 3,924,225 | 12/1975 | Langnickel | 340/324 AD |
| 3,938,137 | 2/1976 | Ngo et al. | 340/804 |
| 3,949,391 | 4/1976 | Benjamin | 340/804 |
| 4,065,754 | 12/1977 | Miara et al. | 340/708 |
| 4,556,880 | 12/1985 | Hamada | 340/784 |

FOREIGN PATENT DOCUMENTS

| | | | |
|---|---|---|---|
| 0145419 | 11/1981 | Japan | 340/709 |

*Primary Examiner*—Marshall M. Curtis
*Assistant Examiner*—Ruffin B. Cordell
*Attorney, Agent, or Firm*—Robert A. Chittum

[57] ABSTRACT

A matrix-addressed display device having a cursor which is movable independently of the displayed information is disclosed. Two interrupt circuits are used to override or interrupt the refresh cycling of the displayed information and to relocate the cursor in the display device in response to a user input control such as a keyboard, joy stick or the like. One interrupt circuit comprises a pair of AND gates and an inverter, while the other interrupt circuit comprises a plurality of AND gate pairs with each pair having an inverter. The interrupt circuits enable the cursor to be moved to its new location prior to completion of the refresh cycling of the displayed information.

7 Claims, 3 Drawing Figures

MATRIX DISPLAY WITH A FAST CURSOR

FIELD OF THE INVENTION

This invention relates to information displays with cursors and, more particularly, to matrix displays, such as liquid crystal displays which have cursors that move independently from the information being displayed.

DESCRIPTION OF THE PRIOR ART

Portable personal computers, as well as television sets and electronic games, require a flat panel display, having a high information content such as individually addressable picture elements or pixels on the order to 10,000 or more. For portable applications, the primary display candidates are liquid crystal displays, electroluminescent displays and vacuum fluorescent displays. However, only liquid crystal displays can be operated satisfactorily at less than 25 volts with a power consumption of 1 to 2 $\mu W/cm^2$. Therefore, true portability implies the use of liquid crystal displays.

As is well known in the art, high-information-content, dot-matrix liquid crystal displays are addressed in a multiplexed mode, individual rows at a time, while data is entered along the column electrodes. This technique reduces the number of drivers needed. For example, to address a display with N number of rows and an equal number of columns, one needs just 2N drivers instead of $N^2$ drivers. The problem is, however, that liquid crystal displays, which are capable of operation in the fast update mode, respond to the RMS value of the voltage level. In case of line-at-a-time addressing of a multiplexed dot matrix, the addressing time and the RMS value of the signal voltage decreases, while the RMS value of the background voltage, that is, the voltage applied to the non-selected elements or pixels of the matrix remains constant. This effect determines the upper limit of multiplexibility, since liquid crystal materials do not have an ideally sharp response with respect to the RMS voltage change. It has been determined, therefore, that the practical limit of direct addressing is in the multiplexing range of 100–200:1.

There are two types of matrices, passive and active. The passive matrix is formed by crossed transparent electrodes, one set of parallel electrodes formed on a transparent substrate which confronts another set of parallel electrodes on another transparent substrate. The electrodes on one substrate are perpendicular to the electrodes on the other substrate and a liquid crystal material is sandwiched between the substrates. The intersection of two crossed electrodes forms the liquid crystal cells or pixels. Generally, the pixel is light transmissive when both electrodes forming the pixel are addressed; that is, a voltage pulse is currently applied to both. A passive matrix is generally one which has its row and column electrodes on different substrates, while the active matrix has its row and column electrodes on the same substrate with its other substrate providing ground or a fixed bias voltage. The primary function of the active matrices are to promote independently addressable digital switches at each crossed electrode or pixel, thereby relieving the liquid crystal of a sharp threshold requirement and extending the duration of the applied voltage. One example of an active matrix device is a thin film transistor formed at each crossed electrode. The source of the transistor is driven by the strobe voltage signal applied to one electrode, the gate is connected to the data signal voltage applied to the other electrode and the transparent drain forms the large pixel electrode. The transistor is turned on when the strobe voltage and the data voltage are applied simultaneously and the rest of the time it is maintained in the off or high impedance condition. In the passive matrix case, the strobe voltage is, of course, less than the electrode-optical threshold voltage for the liquid crystal material. The sum of the absolute values of the strobe voltage and the data voltage is, on the other hand, larger than the "full on" voltage for the liquid crystal material. In the active matrix case, the strobe voltage is less than the turn-on threshold of the transistor. The sum of the strobe and data voltage is, on the other hand, larger than the turn-on threshold of the transistor.

If a liquid crystal display is to be used as the display panel for a personal computer or the like, it must have an independently movable cursor. The cursor could be a symbol such as a rectangle, spaced parallel lines to sandwich characters, or simply a line which generally underlines a character or several characters. The cursor is displayed in accordance with information derived from the conversion of raw positional data into information that is compatible with visual presentation. The input data for the cursor and its location on the liquid crystal display may be either digital or analog and may be entered by such input devices as a joy stick, a "mouse" or the like as well as by keyword. Such input devices provide positional signals which are processed for the production of the cursor display.

The cursors of the prior art liquid crystal displays are generated only after the entire display panel has been strobed or refreshed, so that the movement of the cursor from one location to another moves or reappears in different locations much slower than the user can actually reposition it. This may cause the user to believe an erroneous cursor positioning was made and attempt to reposition it, while in fact the cursor was just slow in arriving at the new position.

U.S. Pat. No. 3,840,695 to A. G. Fischer is directed to a flat color television display panel wherein there is complete integration at the panel level of the driving circuits and the display medium. The panel comprises a flat, thin film transistor matrix-addressed transparent television panel based on twisted nematic liquid crystal light valves illuminated from the rear by white light through a mosaic color film filter. This patent does not involve a cursor, and certainly not one which is move faster than the refresh times. By refresh time it is meant the next addressing of the light crystal light valve one frame later to maintain the charge trapped on the capacitive reactance of the liquid crystal cell or light valve element.

U.S. Pat. No. 3,911,419 to R. D. Bates et al. provides a device for processing positional information by a cursor control device to produce a cursor on a CRT, the cursor being provided independent of any character information being displayed. Another feature disclosed is that when the cursor is on top of a character and there is a conflict in intensity of color, the intensity in color chosen for the cursor overrides that .of the character. Though the cursor is freely movable about the CRT and independent of any character information displayed, it cannot be moved faster than the character generation or character information refresh time.

U.S. Pat. Nos. 3,776,615 and 3,835,463 to M. Tsukamoto et al. disclose matrix-addressed liquid crystal display devices, the first one using d.c. voltage pulses to address the matrix electrodes and the latter using a.c. voltage pulses. U.S. Pat. No. 3,863,221 to T. Kaji and U.S. Pat. No. 3,895,372 to T. Kaji et al. disclose circuits and methods of addressing the electrodes of a liquid crystal display having a matrix of cells which are energized by signals to the electrodes.

U.S. Pat. No. 3,787,834 to J. C. Elliott discloses a liquid crystal display unit comprising a plurality of matrices, each matrix being addressed by a separate buffer register. Digital information representative of the symbols or characters to be printed are stored sequentially in the buffer registers and a particular row of each matrix is sequentially addressed on a time-multiplex basis by its associated buffer register. During the next display cycle, the buffer registers are sequentially reloaded and the next row in each matrix is similarly addressed. The entire display unit is addressed once during the relaxation time of a liquid crystal element.

U.S. Pat. No. 3,921,162 to M. Fukai et al. discloses a method of driving a matrix-addressed liquid crystal display device wherein temperature compensation is performed by varying the magnitude or the frequency of the voltage signal in accordance with the temperature level sensed.

U.S. Pat. No. 3,908,151 to J. D. Schermerhorn discloses a method of introducing logic having AND, NAND, OR and NOR functions into gaseous discharge display devices having electrodes positioned to define discharge sites, so that the transfer of one site to the on-state of discharge will cause an adjacent site to be placed in the on-state of discharge by spatial discharge transfer.

U.S. Pat. No. 3,924,225 to W. Langnickel discloses a character generator including two section selectors which operate with common outputs. One selector acts as a partial vertical row or column selector when the column mode is selected and the other selector acts as a partial horizontal row or line selector when the line mode is employed. A collection circuit combines the output signals of the two section selectors in the partial columns in one mode and in partial lines in the other mode and furnishes them to respective output lines. Such a character generator can be easily switched to either line or column mode operation.

SUMMARY OF THE INVENTION

It is therefore an object of the invention to provide a system by which the cursor can be moved at rapid rates across the matrix display without requiring a high refresh or strobe rate of all the displayed information.

This and other objects are achieved by providing an improved matrix-addressing system for, as an example, a liquid crystal display device having a movable cursor. The matrix includes a first plurality of parallel electrodes oriented in one direction and a second, overlaying plurality of parallel electrodes oriented perpendicular to the first plurality of electrodes. The first and second electrode pluralities are spaced or electrically isolated from each other. Each electrode is individually addressable by a high or low voltage pulse. Electric fields are generated between mutually perpendicular electrodes which are concurrently addressed with a high voltage pulse. The electric fields created act upon the liquid crystal material in the vicinity of the fields to generate light transmissive regions in the display device that represent picture elements or pixels. The matrix addressing system of the present invention includes a microprocessor for providing the serial data-in and line-advance voltage pulses in response to receipt of the information to be displayed and for refreshing the displayed information at a frequency faster than the relaxation time of the liquid crystal material. A first circuitry in the matrix addressing has a shift register adapted to receive serially one line of digitized information data at a time, referred to as the serial data-in, a plurality of latch buffers, and a first set of line drivers. Each electrode in said first electrode plurality is addressable by a one of the line drivers in said first set and each first set line driver is energizable by a respective one of the latch buffers. Upon completion of the shift in of a line of digitized data to the shift registers, the latch buffers are activated and the latch buffers drive the line drivers in said first set accordingly. The addressing system also has a first interrupt circuit positioned between the microprocessor and the shift register, so that the serial data-in is received by the shift register through the first interrupt circuit until it receives an interrupt signal. A second circuitry of the addressing system has a second set of line drivers, one for each electrode in said second plurality of electrodes, a decoder for individually addressing each second set line driver, and a counter for receiving a line-advance voltage. Upon receipt of each of said line-advance voltages by the counter, it addresses the decoder with a predetermined number of digitized outputs which identifies the electrode in said second plurality that is to be addressed. Generally, the electrodes in the second plurality are addressed sequentially. Associated with the second circuitry is a second interrupt circuit located between the counter and the decoder which transmits the counter output therethrough to the decoder until an interrupt signal is received. A means for generating digitized positional information for a selectively movable cursor displayed by the device is provided by a cursor input, such as, for example, a keyboard or "mouse". A cursor controller in the addressing system receives the digitized cursor positional information and, in response thereto, provides interrupt signals to the first and second interrupt circuits to block the serial data-in and line-advance pulses, while concurrently providing the digitized cursor positional information serially to the shift register via the first interrupt circuit and identifying the position of the cursor in the second plurality of electrodes by a cursor counter which addresses the decoder. Once the cursor has been positioned in accordance with the last cursor positional information, the cursor controller ceases the interrupt signals and the serial data-in and line-advance pulses are again transmitted to the shift register and counter/decoder respectively, beginning with the next succeeding electrodes in the refresh cycle prior to the interruption. To prevent the displayed information from fading, the microprocessor delays subsequent repositioning of the cursor for one complete refresh cycle, thus preventing constant cursor repositioning from interfering with the refresh strobing to such an extent that the information displayed fades or becomes unclear. It is thus possible to update the position of the cursor out of sequence with the refresh or strobe update of the displayed information.

DESCRIPTION OF THE PREFERRED EMBODIMENT

Figure 1:
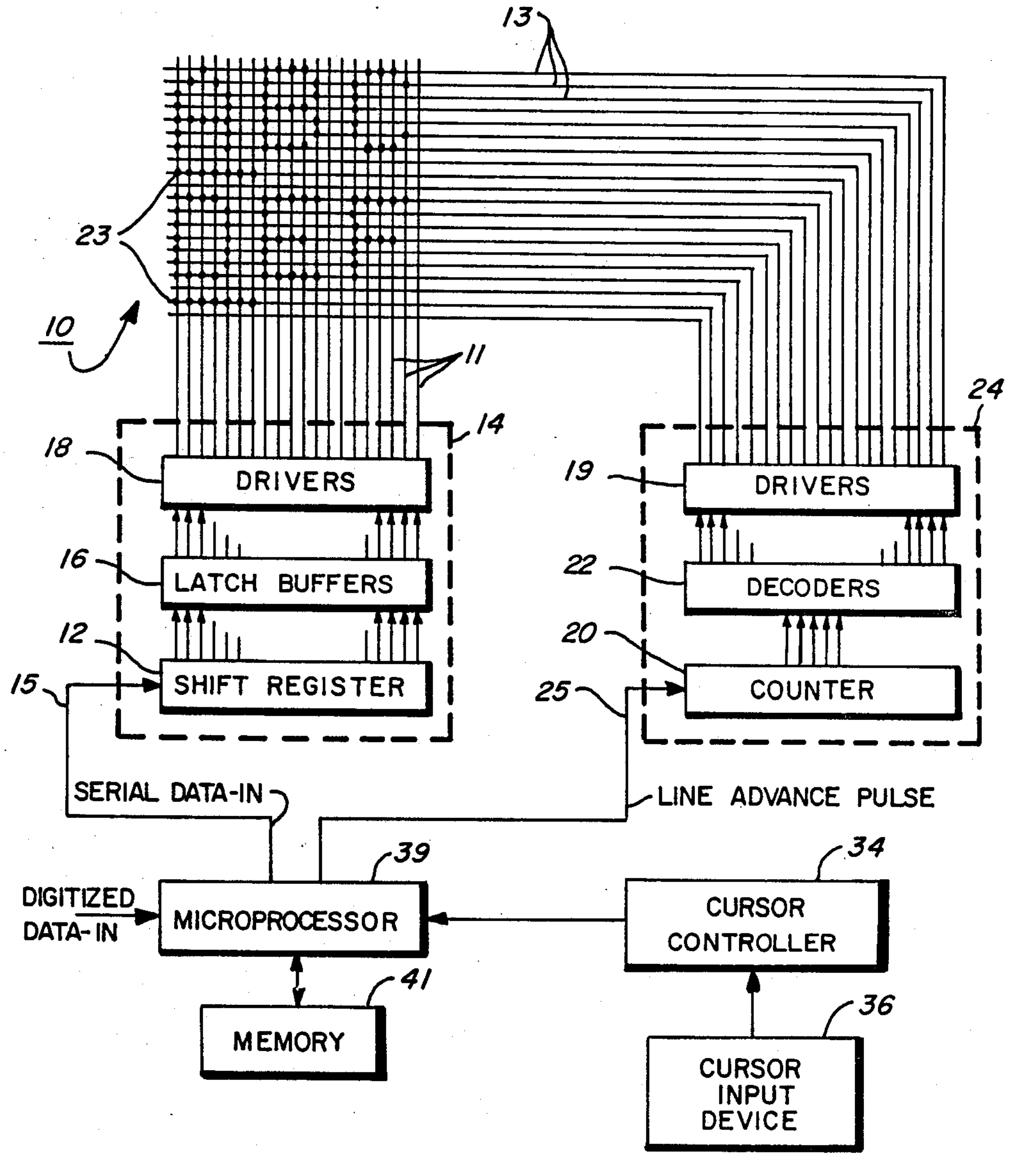
FIG. 1 PRIOR ART
FIG. 1 is a block diagram showing a typical prior art matrix addressed liquid crystal display system.

In FIG. 1, a typical prior art, matrix-addressed liquid crystal display device 10 is shown as a 20 by 20 matrix of vertical electrodes 11 and horizontal electrodes 13 that are mutually perpendicular and electrically isolated from each other. It should be understood, however, that an actual display for a personal computer, for example, would have at least a 100 by 100 matrix, but the smaller matrix is used for ease of description, since the operation principle is the same. Digital information from a computer, character generator or the like (not shown) is received as digitized data-in by any well-known microprocessor, such as, for example, the INTEL 8080® sold by the Intel Corporation. This digitized data-in is stored in a typical memory unit 41 for withdrawal by the microprocessor when the digital information is to be displayed and refreshed. A cursor input device 36, such as a keyboard, joy stick, "mouse" or the like, provides positional information to the cursor controller 34. In response thereto, the cursor controller concurrently sends a signal to the microprocessor 39.

Figure 2:
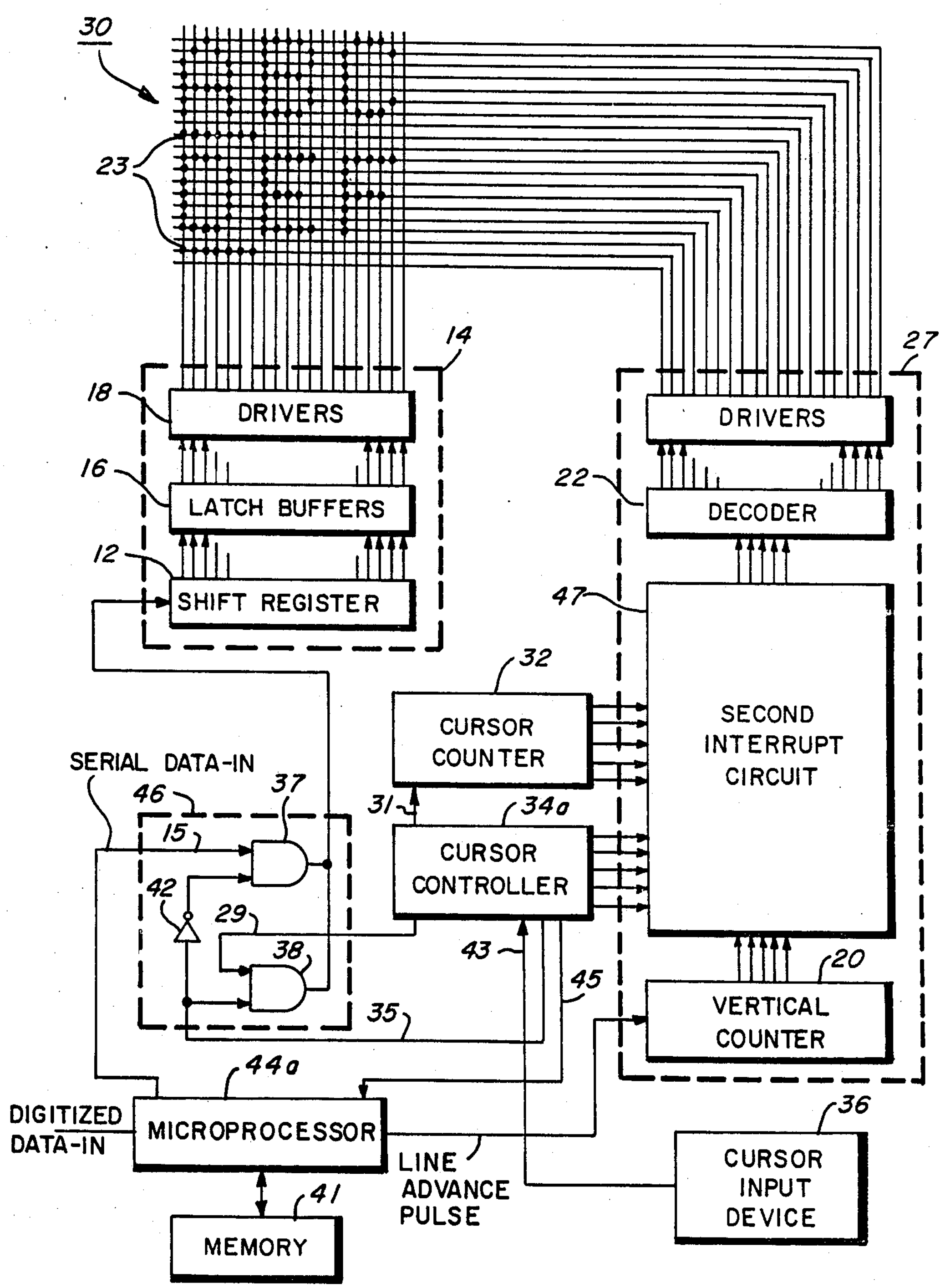
FIG. 2 is a block diagram showing a matrix addressed liquid crystal display embodying the interrupt circuitry of the present invention.
Figure 3:
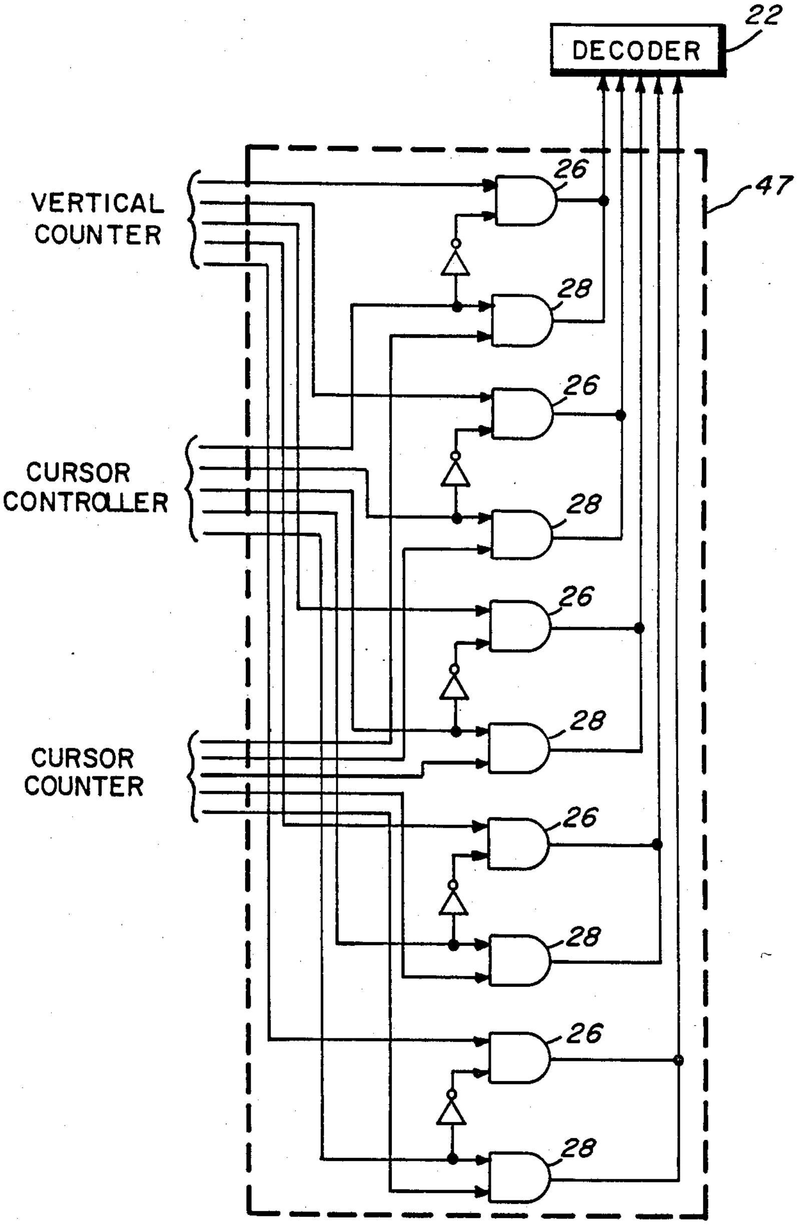
FIG. 3 is a schematic diagram of the second interrupt circuit 47 of FIG. 2.

Digital information from the microprocessor 39 for one horizontal line of pixel information at a time is transmitted one bit or pixel at a time to shift register 12 of the horizontal circuitry 14, outlined in dashed line, by cable 15. Upon completion of the shift in of the complete single line of bit data, the latch buffer 16 is activated to hold the entire line of information. The output of the latch buffer is now frozen to that information present, when the activation occurs. The outputs of the latch buffer drives a line of drivers 18 that activate the appropriate liquid crystal vertical electrodes 11 with the necessary voltage to create one horizontal line of pixels of the display 10. Meanwhile, the counter 20 and decoder 22 combination in the vertical circuitry 24, outlined in dashed line, has received a line-advance pulse signal from the microprocessor and selected the proper single horizontal electrode 13 to be activated. This single horizontal electrode, which is the line on which it is desired to display the information previously fed into the horizontal circuitry 14, is activated, thus displaying the information of this line of bits or pixels. While this line is held on the liquid crystal display device, the next line is being shifted into the shift register in preparation to display the next entire line of pixels. Since the prior art device in FIG. 1 and the preferred embodiment of the present invention in FIG. 2 are illustrated by a 20 by 20 matrix, each require twenty latch buffers 16, horizontal drivers 18 and vertical drivers 19, but the input to the vertical decoder 22 consists of only 5 bits of information, the number required to binarily identify each horizontal electrode 13 to be activated in a $20 \times 20$ matrix. Thus, one horizontal electrode 13 is selectively addressed with a voltage pulse when the line-advance pulse is received by the counter 20 via lead 25 of the vertical circuitry 24. The vertical counter 20 delivers 5 bits of information to the vertical decoder 22 upon receipt of the line-advance pulse by the vertical counter 20 and the decoder, in turn, addresses all twenty of the vertical drivers 19.

In order to display a cursor 23, for example, one comprising a pair of parallel lines which may sandwich a displayed character, it is necessary to shift in the cursor instead of the character or display region between the parallel line cursor, so that the cursor position cannot be updated any faster than the refresh rate of the input or serial data-in and line-advance pulses.

FIG. 2 shows an improved 20 by 20 matrix-addressed liquid crystal display system by which the cursor 23 can be moved at rapid rates across the liquid crystal display device 30 without requiring a high refresh rate for all of the displayed information. Whenever the cursor is repositioned on the liquid crystal display by the cursor input device 36, the new positional information is transmitted to the cursor controller 34*a* via line 43. In response thereto, the cursor controller transmits interrupt signals to the microprocessor 44 via line 45, to the first interrupt circuit 46 (outlined in dashed line) via line 29 and line 35 for interrupting the serial data-in, and to the second interrupt circuit 47, also outlined in dashed line, via lines 33. The second interrupt circuit 47 includes pairs of AND gates 26, 28 which switch the input received by the vertical decoder 22 from the vertical counter 20 to the cursor counter 32. Similarly, the first interrupt circuit 46 includes a pair of AND gates 37, 38 which switches the serial data-in received by the shift register 12 from the microprocessor to the cursor controller, thereby inputting the new cursor positional information as a priority over the refresh strobing of the displayed information.

The cursor input 36, which may be a keyboard, joy stick, a "mouse" or the like, provides positional cursor information in digitized data form to the cursor controller 34*a*. In response thereto, the cursor controller concurrently sends a signal to one of the input ports of AND gate 38 via line 29, a signal to the cursor counter 32 via line 31, a signal to one of the input ports of each AND gate 28 and to one of the input ports of each AND gate 26 through inverters 40 via lines 33, and a signal to one of the input ports of AND gate 37 through an inverter 42 and the other input port of AND gate 38 via line 35. Input serial data-in from the microprocessor enters AND gate 37 through its other input ports via line 15. The outputs from AND gates 37 and 38 of the first interrupt circuit 46 are combined and directed to the shift register 12 of the horizontal circuitry 14. The vertical circuitry 27 differs from the vertical circuitry 24 of FIG. 1 by the addition of the second interrupt circuit 47 comprising AND gates 26, 28 and inverters 40. Output from the vertical counter 20 of vertical ciruitry 27 is received by the other input port of each AND gate 26 while the other input port of these AND gates receive the inverted signals from the cursor control 34*a* via inverters 40. A five bit information signal from the cursor counter 32 is directed to one of the input ports of AND gate 28 while its other input port receives the signal from the cursor control via line 33. The output signals from the AND gates 26, 28 are combined and directed to the decoder 22 which in turn addresses all twenty vertical drivers in the same manner as that of the vertical circuitry 24 of FIG. 1. Therefore, by means of the system in FIG. 2, the position of the cursor is updated out of sequence with the update or refresh strobing of the displayed information. To prevent the displayed information from fading, the microprocessor delays subsequent repositioning of the cursor for one complete refresh cycle, thus preventing constant cursor repositioning from interfering with the refresh strobing to such an extent that the information displayed fades or becomes unclear. It is thus possible to update the position of the cursor out of sequence with the refresh or strobe update of the displayed information.

In a large display consisting of many elements of information, the cursor position can be updated many times faster than the update of the displayed information. For example, if the cursor consists of two parallel lines entered in the lines normally used for margin between the displayed characters, the cursor 23 may be updated ten times as fast as the displayed character specified by the cursor in the case of a 1000 by 1000 element matrix, reducing the refresh time of the reminder of the display cycle by only two percent.

Since the cursor is displayed as two lines, one above and one below the selected letter, the selected letter and the letter after it are not interfered with by the cursor. The length of the cursor is adjustable from the width of one character to a maximum of one entire line length, thus gating more than a single letter into a change data step initiated by the cursor. Optionally, but not shown, the cursor could be made to flash off and on to make it more distinguishable by alternately addressing it and not addressing it (i.e., periodically erasing the cursor). This feature would make the cursor readily identifiable from underlining. Also, since the cursor consists of two lines, it could be made to alternately flash the top and bottom portions of the cursor to distinguish it.

Finally, in case that information such as drawings and other lines occur in the same line with the cursor, it is necessary to sum in the information of that line with the cursor information, so that the update of the cursor does not erase information in the same line. If other forms of the cursor are used that overlap the displayed characters, the entire line including the cursor must be refreshed or strobed at a rate exceeding the normal rate of refresh for all information; this need would, of course, require another embodiment of this invention that is not shown.

In recapitulation, the prior art cursor positional information is generally incorporated into the input serial data and line advance pulse, so that the cursor is moved at the same rate as the information refresh of the displayed information. By moving the cursor input through two separate interrupt circuits, one incorporating two pairs of AND gates and located between the seerial data-in and the shift register, while the other comprises a plurality of AND gate pairs that is located between the counter and decoder, the cursor positional information interrupts the normal refresh cycling of the displayed data to relocate the cursor. This means that with only a one or two percent reduction in display time, the cursor may be updated several orders of magnitude faster depending upon the number of elements or electrodes in the matrix making up the liquid crystal display device.

Many modifications and variations are apparent from the foregoing description of the invention and all such modifications and variations are intended to be within the scope of the present invention.

I claim:

1. In a matrix-addressed display device of the type having at least two mutually perpendicular, spaced arrays of electrodes which form a matrix of crossed electrodes, the electrode arrays sandwiching a display medium responsive to electrical fields generated between the crossed electrodes when they are addressed with a voltage, an independently positionable displayed cursor, and means for refresh cycling information displayed on the display device at a frequency faster than the relaxation time or information fading time of the display medium when the electric fields are removed, a means for repositioning the cursor faster than the refresh cycling time for the entire matrix comprising a first interrupt circuit through which serialized streams of digitized data in the form of voltage pulses are transmitted to the display device matrix through a horizontal circuitry, the horizontal circuitry enabling concurrent addressing of the electrodes in one array with said digitized data voltage pulses, the first interrupt circuit being adapted to interrupt the serialized data streams in response to receipt of a first interrupt signal;

a second interrupt circuit in a vertical circuitry from which line-advance voltage pulses are sequentially transmitted to the electrodes of the other array in the display device matrix in timed relationship with the concurrently addressed electrodes of the other matrix array to create displayed information in said display device medium, the second interrupt circuit being adapted to interrupt the line-advance pulses in response to receipt of a second interrupt signal;

a cursor input device for generating cursor positional information;

a cursor controller for generating the first and second interrupt signals in response to changed cursor positional information and for converting the changed positional information into serialized streams of digitized positional information the cursor controller transmitting the serialized streams of positional information to the first interrupt circuit and concurrently activating a cursor counter that transmits cursor line-advance voltage pulses to the second interrupt circuit in timed relationship with the positional information serial streams; and said first and second interrupt circuits being further adapted to transmit the serialized streams of positional information and cursor line-advance pulses respectively to the display device matrix while said first and second interrupt circuits are in an interrupted state, whereupon, at the conclusion of this transmission to the display device the cursor controller ceases to generate the first and second interrupt signals, removing the first and second interrupt circuits from said interrupted state.

2. The display device of claim 1, wherein the first interrupt circuit comprises a pair of AND gates and an inverter; and wherein the second interrupt circuit comprises a plurality of pairs of AND gates and an inverter for each pair of AND gates.

3. An improved liquid crystal matrix display device of the type having a matrix of mutually perpendicular horizontal and vertical electrodes which are electrically isolated from each other and capable of being individually addressed by a high or low voltage pulse, the concurrent addressing of any two mutually perpendicular electrodes creating an electric field which acts upon a liquid crystal material in said display device to create light transmissive regions therein representative of pixels from which information may be formed and displayed thereby, a microprocessor for receiving digitized information to be displayed and for providing and refreshing the voltage pulses to the electrode matrix to display said information, and a cursor input device with an associated cursor controller and cursor counter for generating and transmitting variable cursor positional data to said display device in the form of voltage pulses for the independent display of a cursor, wherein the improvement comprises:

horizontal circuitry having a shift register for receiving digitized information serially one bit at a time, a plurality of latch buffers interconnected between the shift register and a plurality of line drivers there being a latch buffer and a line driver connectively associated with each of the vertical matrix electrodes for addressing them concurrently in accordance with the line of digitized information;

a first interrupt circuit for passing the digitized information serially to said horizontal circuitry from the microprocessor in the absence of interrupt signals from said cursor controller indicating a change in the cursor position;

vertical circuitry for addressing the horizontal matrix electrodes having a plurality of line drivers, one for each horizontal electrode, a decoder for individually addressing each of the line drives, and a vertical counter for receiving a line-advance voltage pulse and generating signals indicative of the horizontal electrode to be addressed in accordance with the line-advance voltage pulse;

a second interrupt circuit also within the vertical circuitry for passing the signals generated by the vertical counter to said decoder in the absence of signals from the cursor controller and cursor counter indicating a change in the cursor position; and in response to a change in cursor positional data generated by said cursor input device in conjunction with associated cursor controller and cursor counter, said cursor controller provides interrupt signals to the first and second interrupt circuits, and upon receipt of interrupt signals by the first and second interrupt circuits, the refresh cycling of the information displayed is interrupted and the new cursor positional information from the cursor input device is transmitted to the horizontal circuitry through said first interrupt circuit and to the decoder in said vertical circuitry through said second interrupt circuit to thereby display the new position of the cursor without the cursor movement being delayed until the entire electrode matrix of the display device has been refreshed once the cursor positional data is displayed, the cursor controller ceases to produce the interrupt signals and the refresh cycling is continued.

4. The improved display device of claim 3, wherein the first interrupt circuit comprises a pair of AND gates and an inverter; and wherein the second interrupt circuit comprises a plurality of pairs of AND gates and an inverter for each AND gate pair.

5. A matrix-addressed display device having a cursor which may move independently of the information displayed thereon and having a matrix including a first plurality of parallel electrodes oriented in one direction and a second plurality of parallel electrodes oriented perpendicular to the first plurality of electrodes and electrically isolated therefrom, each electrode being individually addressable by a high or low voltge pulse, so that electric fields generated between adjacent mutually perpendicular electrodes in response to high voltage pulses act upon a liquid crystal material within the electric fields to create light transmissive regions in the display device that represent picture elements, the liquid crystal display comprising:

(a) first circuitry having a shift register adapted to receive one line of digitized information data serially and a plurality of latch buffers and line drivers, each electrode in said first plurality of electrodes being addressable by a one of the line drivers and each line driver being energizable by a respective one of the latch buffers said first circuitry also includes means to activate the latch buffers, so that upon completion of the shift in of a line of digitized data, the latch buffers are activated and the latch buffers drive the line drivers accordingly;

(b) a first interrupt circuit comprising a pair of AND gates and an inverter, the first interrupt circuit being positioned between the serial input data and the shift register of said first circuitry to enable the passage of the input data therethrough until an interrupt signal is received;

(c) second circuitry having a plurality of line drivers, one for each electrode in said second plurality of elecrtrodes, a decoder for individually addressing each line driver in the second circuitry, a counter for receiving a line-advance voltage and, in response thereto, being adapted to address the decoder with a counter signal representative of the next electrode in said second plurality of eletrodes to be sequentially addressed;

(d) a second interrupt circuit comprising pairs of AND gates and an inverter for each pair, the second interrupt circuit being located between the counter and decoder and being adapted to pass the counter output to the decoder until an interrupt signal is received;

(e) means for refreshing the displaced information at a frequency faster than the relaxation time of the liquid crystal material;

(f) means of regenerating digitized positional information for a cursor;

(g) a cursor counter; and (h) a cursor controller for receiving the digitized positional information of the cursor from said means for generating information and in response thereto, for providing interrupt signals to the first and second interrupt circuits and said refreshing means, and for providing a signal to activate the cursor counter, while concurrently providing the digitized cursor positional information serially to the shift register via the first interrupt circuit, the activated cursor counter addressing the decoder through the second interrupt circuit with a cursor counter signal representative of the electrodes to be sequentially addressed to display the cursor in its new location, so that the cursor is moved to its new location prior to completion of the refresh cycling of the displayed information.

6. The display device of claim 1, wherein the horizontal circuitry comprises a shift register, latch buffer and individual electrode drivers for one electrode array; and wherein the vertical circuitry further comprises a vertical counter, decoder, and individual electrode drivers for the other electrode array.

7. The display device of claim 3, wherein the improvement further comprises means to delay each subsequent consecutive repositioning of the cursor for one complete refresh cycle to prevent the displayed information from fading.

* * * * *